(12) United States Patent
Buschmann et al.

(10) Patent No.: US 8,936,145 B2
(45) Date of Patent: Jan. 20, 2015

(54) MATERIAL CONVEYOR SYSTEM FOR A ROAD PAVER AND FEEDER

(75) Inventors: Martin Buschmann, Neustadt (DE); Steffen Fickeisen, Bad Dürkheim (DE)

(73) Assignee: Joseph Vogele AG, Ludwigshafen/Rhein (DE)

( * ) Notice: Subject to any disclaimer, the term of this patent is extended or adjusted under 35 U.S.C. 154(b) by 3 days.

(21) Appl. No.: 13/640,693

(22) PCT Filed: Apr. 15, 2011

(86) PCT No.: PCT/EP2011/001935
§ 371 (c)(1),
(2), (4) Date: Nov. 30, 2012

(87) PCT Pub. No.: WO2011/128111
PCT Pub. Date: Oct. 20, 2011

(65) Prior Publication Data
US 2013/0062164 A1    Mar. 14, 2013

(30) Foreign Application Priority Data
Apr. 16, 2010    (EP) .................................. 10004061

(51) Int. Cl.
*B65G 65/22* (2006.01)
*B65G 37/00* (2006.01)
(Continued)

(52) U.S. Cl.
CPC ................ *B65G 37/00* (2013.01); *B65G 65/46* (2013.01); *B65G 65/22* (2013.01);
(Continued)

(58) Field of Classification Search
CPC ........ B65G 29/00; B65G 65/22; B65G 65/46; B65G 47/18; B65G 33/10; B65G 21/10; B65G 11/12; B65G 33/26; A01K 5/0258

USPC .............. 198/544, 611, 526, 528, 535, 550.1, 198/547, 550.2, 625, 657, 545, 548, 550.6, 198/550.9, 550.13, 589, 592, 670; 193/15, 193/16, 17, 22

See application file for complete search history.

(56) References Cited

U.S. PATENT DOCUMENTS 3,743,432 A * 7/1973 Lee .............................. 404/84.1
4,322,178 A * 3/1982 Lee ................................. 404/83
(Continued)

FOREIGN PATENT DOCUMENTS

CN    1235223 A    11/1999
CN    2579940 Y    10/2003
(Continued)

OTHER PUBLICATIONS

International Search Report mailed Jul. 15, 2011, which issued in corresponding International Application No. PCT/EP2011/001935.
(Continued)

*Primary Examiner* — Leslie A Nicholson, III
(74) *Attorney, Agent, or Firm* — Fish & Richardson

(57) ABSTRACT

The invention relates to a material conveyor system (1) for a road paver and feeder. The material conveyor system (1) comprises a material hopper (2), which comprises a first and a second hopper half (3, 4), a main conveyor device (5), which defines a main conveyor flow and which runs between the first and the second hopper halves (3, 4), and conveying screws (6, 7), which define a transverse conveyor flow and which are arranged in the hopper halves (3, 4). The material conveyor system (1) is characterized in that the conveying screws (6, 7) can be operated independently of the main conveyor device. The independent operation of the conveying screws (6, 7) and the main conveyor device (5) makes it possible to achieve improved homogenization of the mixing temperature of the paving material.

18 Claims, 2 Drawing Sheets

Figure 1:
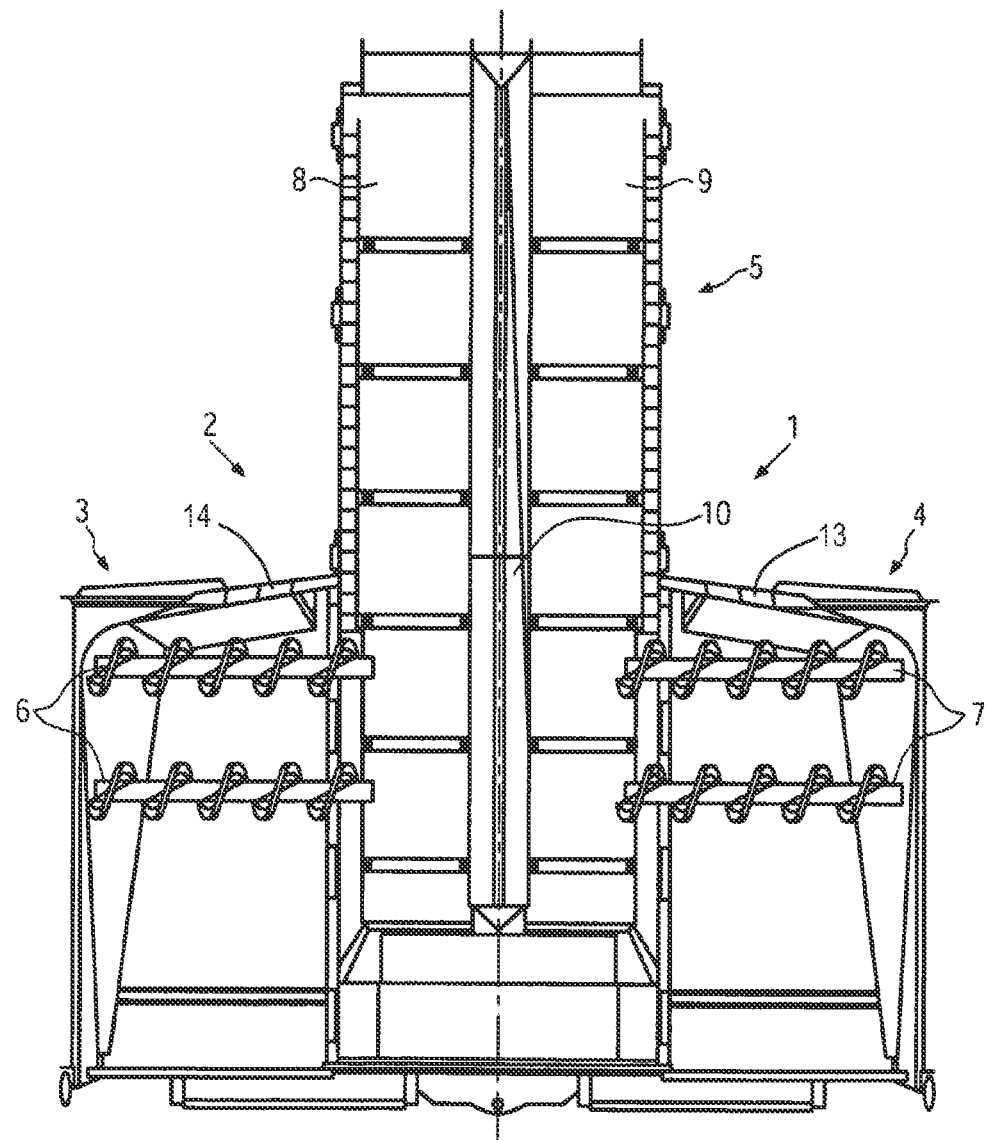

(51) Int. Cl.
  *B65G 65/46* (2006.01)
  *B65G 33/10* (2006.01)
  *B65G 47/18* (2006.01)
  *B65G 11/12* (2006.01)
  *E01C 19/48* (2006.01)

(52) U.S. Cl.
  CPC .............. *B65G 33/10* (2013.01); *B65G 47/18* (2013.01); *B65G 11/12* (2013.01); *E01C 19/48* (2013.01); *E01C 2301/04* (2013.01)
  USPC ..... 198/625; 198/611; 198/550.1; 198/550.2; 198/657; 198/545; 198/548; 198/550.6

(56) References Cited

U.S. PATENT DOCUMENTS

| | | | |
|---|---|---|---|
| 4,823,366 A | * | 4/1989 | Williams .......................... 377/2 |
| 5,857,804 A | * | 1/1999 | Musil .............................. 404/104 |
| 6,086,287 A | * | 7/2000 | Sharpe et al. ................... 404/75 |
| 6,193,437 B1 | | 2/2001 | Heims |
| 6,309,138 B1 | * | 10/2001 | Yasu et al. ..................... 404/101 |
| 6,368,555 B1 | * | 4/2002 | Goeldner ........................ 422/26 |
| 2010/0040412 A1 | | 2/2010 | Fickeisen |

FOREIGN PATENT DOCUMENTS

| | | |
|---|---|---|
| EP | 1213390 A3 | 10/2003 |
| JP | 57195039 A * | 11/1982 |
| WO | 2009/061278 A1 | 5/2009 |
| WO | WO2011128111 A1 | 10/2011 |

OTHER PUBLICATIONS

Office Action which issued Apr. 3, 2014 in corresponding Chinese application No. 2011800194336, with English translation thereof.

* cited by examiner

MATERIAL CONVEYOR SYSTEM FOR A ROAD PAVER AND FEEDER

CROSS REFERENCE TO PRIOR APPLICATIONS

This is a U.S. National Phase application under 35 U.S.C. §371 of International Patent Application No. PCT/EP2011/001935, filed Apr. 15, 2011, and claims the priority of European Patent Application No. 10004061.7, filed Apr. 16, 2010 both of which are incorporated by reference herein in their entirety. The International Application published in English on Oct. 20, 2011 as WO 2011/128111 under PCT Article 21(2).

The invention relates to a material conveyor system in accordance with the introductory portion of Patent claim 1.

Bituminously bound asphalt mixtures are manufactured in mixing systems. This is done by heating stone chippings in a rotary furnace and subsequently feeding them to a mixer. In this mixer, hot bitumen is additionally injected and mixed with the hot stone chippings. This mixture is then temporarily stored in hot silos or transported directly to the road construction site by means of HGV. The asphalt leaves the mixer at a high and very uniform temperature. The asphalt mixture cools non-uniformly due to the subsequent storage and particularly due to the transport. Typically the asphalt still has a very high core temperature when delivered to the construction site, but the edge areas have cooled significantly. There is then no longer an asphalt mixture with a uniform temperature. A uniform temperature distribution in the asphalt mixture is one of the most important parameters for laying and compacting asphalt. Many material characteristics of the asphalt depend on this temperature. This is substantially associated with the viscosity of the bitumen, which viscosity changes with the temperature. A non-uniform temperature of the asphalt mixture is therefore a factor that has a negative influence on the quality of the roadway surface. It leads to density differences in the carrying capacity, as well as to mistakes in the layer thickness and, as a result, to unevennesses in the driving surface.

These insights have been used and implemented in a feeder system that is intended to improve the homogeneity of the asphalt mixture temperature. To this end, one uses, e.g., conveying screws that are arranged in the material hopper such that they are transverse to the main conveyor flow. The drive of the conveying screws is connected to the primary conveyor for the main conveyor flow. The rotational speed of the conveying screws is consequently proportional to the conveying capacity of the primary conveyor. Due to the conveying screws, colder asphalt mixture is continuously conveyed from the edge areas and into the hotter main conveyor flow during the feeding process. This ongoing mixing leads to improved temperature homogeneity in the asphalt mixture. Limits are set for this feeder system due to the solid coupling of the drives of the conveying screws and of the belt conveyor system of the primary conveyor. It is consequently not possible, for example, to switch off the conveying screws at the beginning of the conveying process. This would appear to be useful, however, because the first material surge that comes from the HGV is relatively cold and should not necessarily initially be mixed into the asphalt mixture. It is furthermore not possible to change the relationship between the transverse conveyor quantity and the main conveyor flow in order in this way to control the relationship between the cold edge material and the hot core material.

The basis of the invention is formed by the object of creating a material conveyor system for a feeder or for a road paver, whereby, by using simple design means, this material conveyor system allows improved temperature homogeneity to be achieved in the asphalt mixture.

This object is solved according to the invention with the technical features of Claim 1. Improved further developments are given by the features of the dependent claims.

The invention relates to a material conveyor system for road pavers and feeders. This system comprises a material hopper, which has a first and a second hopper half, a main conveyor device, which defines a main conveyor flow and which runs between the first and the second hopper half, and conveying screws, which define a transverse conveyor flow and which are arranged in the hopper halves, whereby the conveying screws according to the invention can be operated independently of the main conveyor device. The operator can consequently change the relationship between the transverse conveyor flow and the main conveyor flow in order selectively to influence a mixing temperature after the mixture leaves the material hopper.

In an expedient embodiment, a control system for controlling the transverse conveyor flow independently of the main conveyor flow is present in order to control a relationship between the transverse conveyor flow and the main conveyor flow. In this way it is possible to achieve a desired, homogenous mixing temperature in the paving material with particular precision. The start-up of the conveying screws can thereby take place with a delay by means of a corresponding sequence controller. In this way, hot core material can reach the main conveyor flow as quickly as possible when the feeding cycle begins. The conveying screws are not started up until after this. It is likewise possible for the conveying screws to be switched off early towards the end of the feeding cycle. This prevents the cooled-down paving material from the edge areas from being fully used.

The power-on delay of the conveying screws or the early power-off can take place by means of a sequence controller or alternatively via a temperature measurement system of the main conveyor flow, which registers the temperature of the asphalt mixture after it leaves the material hopper. The temperature of the main conveyor flow is then used as a criterion for the appropriate regulation of powering the conveying screws on and off. Based on the temperature of the main conveyor flow, the conveying screws can consequently be operated in such a way that a homogeneous mixing temperature of the paving material is set up. The temperature measurement system can likewise be provided to measure the temperature of the transverse conveyor flow in order to control an operation of the conveying screws independently of the main conveyor device.

A sheet metal chute that can pivot towards the main conveyor device is preferably arranged on the hopper halves in order to guide conveyed material on to the main conveyor device. In this way, the conveyed material can be reliably guided on to the main conveyor device while the sheet metal chute simultaneously prevents the conveyed material from landing in the undercarriage of the main conveyor device.

In an expedient embodiment, the main conveyor device comprises two separate conveyor belts that are separated from each another by means of a separating wall. The separating wall supports a purposeful spilling of the paving material on to the two conveyor belts.

There is also the possibility that the conveyor belt or the conveyor belts of the main conveyor device can be operated independently of one another. In this way, it is guaranteed that in the event of an early emptying of one hopper half, the associated conveyor belt can be stopped early. A relationship of the transport of the paving material can likewise be selected between the conveyor belts.

In an expedient embodiment, the hopper halves can be simultaneously or independently of each other tilted towards the main conveyor device at an angle between zero and forty-five degrees. In this way, it is possible to accelerate the transport of the paving material out of the bunker halves and towards the main conveyor device.

The conveying screws preferably also tilt when the hopper halves tilt. The tilted conveying screws thereby support an accelerated transport of the paving material.

Preferably there is at least one conveying screw per hopper half. Depending on the capacity of the hopper halves, a plurality of conveying screws can be used. All of the paving material can consequently be transported from the hopper halves to the main conveyor device by means of conveying screws.

It has proven to be especially advantageous if a front end of the conveying screws juts over the main conveyor device. In this way, the transverse conveyor flow is guided into the main conveyor flow especially effectively.

It is advantageous if the conveying screws of the first hopper half can be operated independently of the conveying screws of the second hopper half. In this way, those conveying screws whose hopper half has already been emptied can be stopped early. It is furthermore possible to drive the respective conveying screws separately depending on the temperature distribution in the paving material of the respective bunker halves.

The conveying screws are preferably arranged in the hopper halves at an angle to the main conveyor device that is greater than sixty degrees. Improved mixing of the paving material can already be brought about in the bunker halves by means of this skewed position.

In the case of an expedient embodiment, the conveying screws can be rotated to the left and to the right. A left rotation or a right rotation of the conveying screws can thereby convey paving material towards the main conveyor device or keep the paving material away from the main conveyor device. A rotation made in the opposite direction of the transverse conveyor flow direction can have as its object that paving material is held back in the hopper halves and consequently does not influence the main conveyor flow.

The hopper halves can optionally be supported in such a way that they can be pivoted backwards around an axis X simultaneously or independently. Due to the pivoting of the hopper halves around the axis X, the material hopper is slanted backwards. As a result, paving material which is still to be found in the hopper halves can be accumulated selectively in a rear zone of the material hopper. A slanted position of the material hopper around the axis X allows complete use of the paving material.

Figure 2:
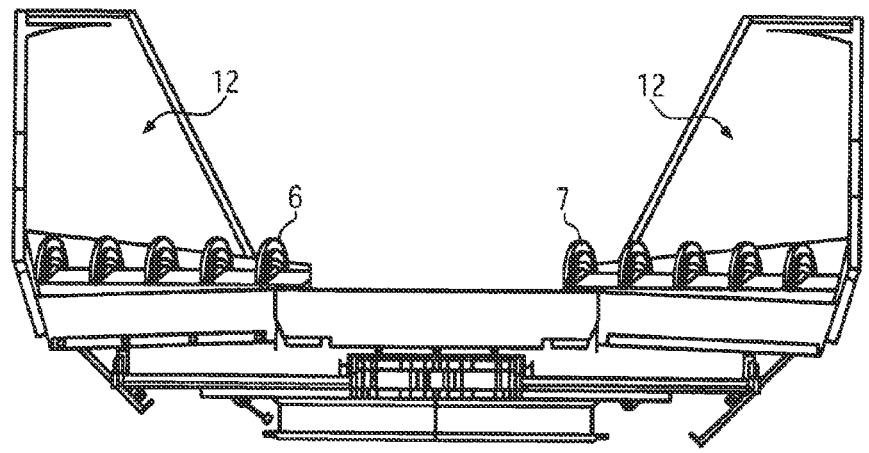
Figure 3:
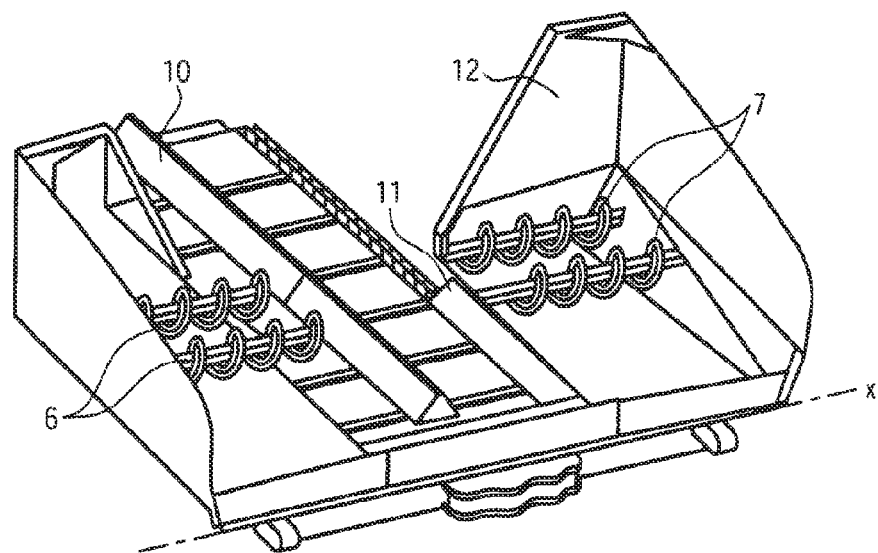

The subject matter of the invention is now explained on the basis of the drawings. Shown are:

FIG. 1 a schematic top view of a material conveyor system which can be used with feeders or with road pavers, FIG. 2 a sectional representation of the material conveyor system, FIG. 3 a lateral view onto the material conveyor system.

FIG. 1 relates to a material conveyor system 1 as it can be applied, according to the invention, to road pavers or to feeders. The job of the material conveyor system 1 is to favour the homogenisation of the paving material temperature, whereby a regulation of the temperature of the paving material is possible. Because a non-uniform temperature distribution in the paving material during asphalting can lead to damages in the pavement, the material conveyor system 1 offers a technical solution in order to counteract a non-uniform temperature distribution in the paving material. The material conveyor system 1 comprises a material hopper 2 that has at the sides a first and a second hopper half 3, 4. Before the laying or before the feeding, bituminous paving material is stored in the material hopper 2. The first and the second hopper halves 3, 4 can thereby hold an especially large amount of paving material. The paving material is usually transported to the construction site by an HGV, in order then to be fed to a feeder or a road paver. A non-uniform temperature distribution has already formed in the paving material during the transport on the HGV. The paving material, which is shaken on to the material hopper 2, is consequently likewise characterised by an inhomogeneous temperature distribution.

The material conveyor system 1 additionally comprises a main conveyor device 5 that runs centred relative to the material hopper 2 and that divides this material hopper 2 into its two hopper halves 3, 4. The main conveyor device 5 is fed paving material by the first and/or the second hopper half 3, 4, whereby this paving material then leaves the material hopper 2 as the main conveyor flow. The main conveyor device 5 transports a required quantity of paving material to the paving location of the road paver or it is a part of the feeder system.

Conveying screws 6, 7 are arranged in the first and the second hopper halves 3, 4, transverse to the direction of the main conveyor flow. The conveying screws 6, 7 define a transverse conveyor flow that transports paving material from the first and the second hopper halves 3, 4 in the direction of the main conveyor device 5. A homogeneous temperature distribution in the paving material of the main conveyor flow is achieved especially due to the fact that it is possible to operate the conveying screws 6, 7 independently of the main conveyor device 5. A mixing of the main conveyor flow with the transverse conveyor flow comes about if paving material is conveyed transverse to the main conveyor flow direction by the conveying screws 6, 7.

If the conveying screws 6, 7 are switched off, the paving material can be held back in the first and the second hopper halves 3, 4. Switching off the conveying screws 6, 7 is especially desirable if the paving material of the first and of the second hopper halves 3, 4 has cooled down and a low temperature of the paving material of the first and of the second hopper halves 3, 4 should not influence a higher temperature of the paving material of the main conveyor flow.

In order to control the operation of the conveying screws 6, 7 or of the main conveyor device 5 independently of one another, the material conveyor system 1 comprises a control system 13. The control system 13 can set up a relationship between the transverse conveyor flow and the main conveyor flow. The control system 13 can be present, e.g., as a sequence controller that delays the start-up of the conveying screws 6, 7 or that stops the conveying screws 6, 7 early on.

During the unloading of the HGV, hot paving material is first placed on to the main conveyor device 5. In order to feed this to the paving location immediately without the admixture of paving material from the transverse conveyor flow, the conveying screws 6, 7 remain switched off. The conveying screws 6, 7 are not then switched on by the sequence controller until after a certain time has passed. A complete emptying of the first and the second hopper halves 3, 4 can furthermore be prevented by the sequence controller by means of stopping the conveying screws 6, 7 early on. As a result, cooled-off edge material remains in the hopper halves 3, 4. The cooled-off edge material can be mixed with a new load of paving material to form a paving material with a higher temperature.

Due to the independent drive of the conveying screws 6, 7 and the main conveyor device 5, a volume flow can be set up selectively in the main conveyor direction. Consequently, even given a high speed of the main conveyor device 5, the speed of the conveying screws 6, 7 can be low or the speed of the conveying screws 6, 7 can be comparatively high when there is a low speed of the main conveyor device 5.

An independent drive can also be set up precisely by means of a temperature measurement system 14 which is present to measure a temperature of the main conveyor flow after it has exited the material hopper or a temperature of the transverse conveyor flow. Because the temperature of the main conveyor flow or of the transverse conveyor flow is measured, the measurement result can be used to regulate the operation of the conveying screws 6, 7 accordingly. Additionally, the speed of the main conveyor device 5 or of the conveying screws 6, 7 can be regulated as a reaction to the temperature measurement of the main conveyor flow or of the transverse conveyor flow. It often appears expedient to bring about a slowing down of the main conveyor device 5 if a high temperature is measured in the main conveyor flow and simultaneously to increase the speed of the conveying screws 6, 7.

In contrast to this, the operation of the conveying screws 6, 7 is slowed down or stopped if a temperature close to the target temperature of the main conveyor flow occurs.

The main conveyor device 1 can consist of two conveyor belts 8, 9. While the conveyor belt 8 essentially takes in the transverse conveyor flow of the first hopper half 3, the conveyor belt 9 is used to hold the transverse conveyor flow of the second hopper half 4. The two conveyor belts 8, 9 can be regulated such that they run independently of one another. Depending on the desired volume flow relationship between the two conveyor belts 8, 9, their speeds can be selected independently of each other.

A separating wall 10 can be arranged between the two conveyor belts 8, 9. The separating wall 10 can prevent paving material from falling from one of the conveyor belts 8, 9 into the undercarriage of the main conveyor device 5. The separating wall furthermore supports a uniform distribution of the paving material on to the conveyor belts 7. 8.

In order to introduce the transverse conveyor flow coming out of the first and the second hopper halves 3, 4 into the main conveyor flow effectively, a pivoting sheet metal chute 11 is arranged on the hopper halves 3, 4. By means of the sheet metal chute, it is possible to prevent paving material from falling into an area between the hopper halves 3, 4 and the main conveyor device 5.

In order to accelerate a conveying of the transverse conveyor flow, the hopper halves 3, 4 can optionally be tilted simultaneously or independently of each other towards the main conveyor flow direction at an angle of up to forty-five degrees. In the event of a tilting of the hopper halves 3, 4, the conveying screws 6, 7 also tilt without thereby colliding with the main conveyor device 5. The conveying screws 6, 7 can be connected as needed in the invention in order to support a transverse conveyor flow or to mix paving material of the hopper halves 3, 4 with the paving material of the main conveyor flow. It has proven to be useful to use at least one conveying screw per hopper half.

Effective mixing of the transverse conveyor flow with the main conveyor flow and consequently improved homogenisation of the paving material temperature is supported by means of having the conveying screws 6, 7 jut beyond the sheet metal chute 11 into the main conveyor flow of the main conveyor device 5. This leads to optimal mixing of the transverse conveyor flow with the main conveyor flow.

The conveying screws 6 of the first hopper half 3 can also optionally be operated independently of the conveying screws 7 of the second hopper half 4. This offers the opportunity of mixing into the main conveyor flow paving material from only one of the two hopper halves 3, 4, while no transverse conveyor flow of the other hopper half takes place. This appears to be expedient if only roughly half, in terms of quantity, of the paving material should be conveyed. Additionally, the speed of the conveying screws 6 can be selected independently of the speed of the conveying screws 7 by the sequence controller.

The conveying screws 6, 7 can be set up in the first and the second hopper halves 3, 4 at an angle $\beta$ to the main conveyor flow. Depending on the application, the angle $\beta$ can be greater than sixty degrees. A setting of the conveying screws 6, 7 opposite to the direction of the main conveyor flow allows the transverse conveyor flow to be mixed with the main conveyor flow in a rear area of the material hopper 2. As a result, the mixed paving material first covers a certain distance along the main conveyor device 5 before it passes the temperature measurement device, as a result of which a realistic temperature measurement of the main conveyor flow by the temperature measurement system 14 takes place. Alternatively, the conveying screws 6, 7 can also be placed in the direction of the main conveyor flow, as a result of which the transport of the paving material can be accelerated along the main conveyor flow direction.

In a further embodiment, the conveying screws 6, 7 are rotatable on both sides, i.e., they can be rotated to the left and to the right. Depending on the construction of the conveying screws 6, 7, in the case of a rotation opposite to the direction of the transverse conveyor flow, paving material can be held back in the hopper halves 3, 4.

A rotation of the conveying screws 6, 7 opposite to the direction of the transverse conveyor flow also aims at circulating the paving material in the hopper halves 3, 4. During the recirculation in the hopper halves 3, 4 it is possible to avoid as far as possible a mixing of the transverse conveyor flow with the main conveyor flow. If the paving material from the hopper halves 3, 4 is desired, the rotation direction of the conveying screws 6, 7 changes in order to guide the transverse conveyor flow into the main conveyor flow.

FIG. 2 shows a sectional representation of the material conveyor system 1. FIG. 2 shows rear tailboards 12 that support the paving material in the material hopper 2. The rear tailboards 12 are formed with double-walls and enclose an air gap. As a result of the double-walled formation of the rear tailboards 12, it is possible to prevent an excessive heat transfer on to the undercarriage of the feeder or the road paver. Furthermore, FIG. 2 illustrates that the conveying screws 6, 7 jut out of the hopper halves 3, 4 and over the main conveyor device 5.

FIG. 3 depicts clearly the geometric shape of the hopper halves 3, 4. In order to influence the mixing of the transverse conveyor flow into the main conveyor flow, the hopper halves 3, 4 can also be pivoted around an axis X independently of one another or simultaneously. The pivoting around the axis X causes the transverse conveyor flow to be mixed into the main conveyor flow at a higher level. The material hopper 2 can also optionally comprise a front closing tailboard (not shown) against which the paving material moves when the material hopper 2 pivots clockwise around the axis X.

The invention claimed is:

1. Material conveyor system for a road paver and feeder, comprising:
    a material hopper, which comprises a first and a second hopper half,
    a main conveyor device, which defines a main conveyor flow and which runs between the first and the second hopper halves,
    conveying screws, which define a transverse conveyor flow and which are arranged in the hopper halves, wherein the conveying screws can be operated independently of the main conveyor device, and a sheet metal chute that can be pivoted towards the main conveyor device is arranged on the hopper halves in order to guide the conveyed material on to the main conveyor device.

2. Material conveyor system according to claim 1 comprising a control system for controlling the transverse conveyor flow independently of the main conveyor flow in order to control a relationship between the transverse conveyor flow and the main conveyor flow.

3. Material conveyor system according to claim 1 comprising a temperature measurement system for measuring a temperature of the main conveyor flow and/or of the transverse conveyor flow in order to control an operation of the conveying screws independently of the main conveyor device.

4. Material conveyor system according to claim 1 wherein the main conveyor device comprises two conveyor belts that are separated from each other by a separating wall.

5. Material conveyor system according to claim 4 wherein the conveyor belts can be operated independently of each other.

6. Material conveyor system according to claim 1 wherein the hopper halves are configured to be simultaneously or independently of one another tilted towards the main conveyor device at an angle $0°<\alpha<45°$.

7. Material conveyor system according to claim 6 wherein the conveying screws tilt when the hopper halves are tilted.

8. Material conveyor system according to claim 1 wherein one or more conveying screws are present per hopper half.

9. Material conveyor system according to claim 8 wherein the conveying screws of the first hopper half are configured to be operated independently of the conveying screws of the second hopper half.

10. Material conveyor system according to claim 1 wherein a front end of the conveying screws juts over the main conveyor device.

11. Material conveyor system according claim 1 wherein the conveying screws are arranged at an angle $\beta>60°$ towards the main conveyor device.

12. Material conveyor system according to claim 1 wherein the conveying screws are configured to be rotated to the left and to the right.

13. Material conveyor system according to claim 1 wherein the hopper halves are supported such that they can be simultaneously or independently pivoted around an axis x.

14. Road paver or feeder with a material conveyor system according to claim 1.

15. Material conveyor system for a road paver and feeder, comprising:
a material hopper, which comprises a first and a second hopper half,
a main conveyor device, which defines a main conveyor flow and which runs between the first and the second hopper halves, and
conveying screws, which define a transverse conveyor flow and which are arranged in the hopper halves,
wherein the conveying screws can be operated independently of the main conveyor device, and
wherein the main conveyor device comprises two conveyor belts that are separated from each other by a separating wall.

16. Material conveyor system according to claim 15 comprising a temperature measurement system for measuring a temperature of the main conveyor flow and/or of the transverse conveyor flow in order to control an operation of the conveying screws independently of the main conveyor device.

17. Material conveyor system according to claim 15, wherein the hopper halves are configured to be simultaneously or independently of one another tilted towards the main conveyor device at an angle $0°<\alpha<45°$.

18. Material conveyor system according to claim 15, wherein at least two conveying screws are present per hopper half.

* * * * *